US009643075B2

(12) United States Patent
Brault

(10) Patent No.: US 9,643,075 B2
(45) Date of Patent: May 9, 2017

(54) POWER-AUTOMATED TRACTION FOR SKIS

(71) Applicant: Jean Brault, Cowansville (CA)

(72) Inventor: Jean Brault, Cowansville (CA)

( * ) Notice: Subject to any disclaimer, the term of this patent is extended or adjusted under 35 U.S.C. 154(b) by 0 days.

(21) Appl. No.: 14/998,718

(22) Filed: Feb. 8, 2016

(65) Prior Publication Data
US 2016/0158633 A1  Jun. 9, 2016

Related U.S. Application Data

(63) Continuation-in-part of application No. 14/120,857, filed on Jul. 7, 2014, now Pat. No. 9,326,567.

(51) Int. Cl.
*A63C 7/10* (2006.01)
*B62M 27/02* (2006.01)
*A63C 5/12* (2006.01)
*A43C 15/14* (2006.01)
*A63C 7/00* (2006.01)
*A63C 9/08* (2012.01)
*B62B 17/02* (2006.01)

(52) U.S. Cl.
CPC .......... *A63C 7/1086* (2013.01); *A43C 15/14* (2013.01); *A63C 5/12* (2013.01); *A63C 7/005* (2013.01); *B62M 27/02* (2013.01); *A63C 9/0807* (2013.01); *A63C 2203/12* (2013.01); *A63C 2203/22* (2013.01); *B62B 17/02* (2013.01); *B62M 2027/025* (2013.01)

(58) Field of Classification Search
CPC ..... A63C 7/1073; A63C 7/108; A63C 7/1086; A63C 7/1093; A63C 7/12; A63C 7/005; A63C 5/12; A43C 15/14; B62M 27/02

USPC ........... 280/604, 605, 606, 607, 809, 28.11; 188/5, 8, 32
See application file for complete search history.

(56) References Cited

U.S. PATENT DOCUMENTS

| | | | | |
|---|---|---|---|---|
| 2,107,363 A | * | 2/1938 | Binder ..................... | A63C 7/08 134/67 |
| 4,152,007 A | * | 5/1979 | Smith .................. | A63C 7/1086 188/6 |
| 4,911,461 A | * | 3/1990 | Humphrey ............. | A63C 11/00 188/5 |
| 4,986,561 A | * | 1/1991 | Humphrey ............. | A63C 11/00 280/605 |

(Continued)

OTHER PUBLICATIONS

Naseem Daher, Chuang Wang, and Monnika Ivantysynova, Novel Energy-Saving Steer-by Wire System for Articulated Steering Vehicales: Study, Jun. 3-5, 2013 Indiana USA.

*Primary Examiner* — John Walters

(57) ABSTRACT

Traction systems for skis producing traction on snow and ice covered surfaces; the skis selected from a group consisting a pair of Back Country skis each are mounted with an apparatus; having DC powered controls, tilt switch, pressurized carbon dioxide ($CO_2$) gas powered pneumatic actuators operating gripping parts; controlled by a servo unit. And further consisting a pair of snowmobile skis each having an assembly of parts; driven by an hydraulic rotor that pivots the skis, adjusting their position when cornering, providing traction, according to a snowmobile steering system. And is powered and controlled by at least one of: hydraulic steering system, an electro-hydraulic steering system; an electric power steering system using an electric motor instead of hydraulic rotor.

2 Claims, 5 Drawing Sheets

(56) References Cited

U.S. PATENT DOCUMENTS

| | | | | |
|---|---|---|---|---|
| 6,308,966 B1 * | 10/2001 | Cook | ............... | B60T 1/14 |
| | | | | 180/183 |
| 8,122,617 B1 * | 2/2012 | Dixon | ............... | A43C 15/14 |
| | | | | 36/61 |
| 2004/0140637 A1 * | 7/2004 | Cook | ............... | A63C 5/06 |
| | | | | 280/28.11 |

* cited by examiner

POWER-AUTOMATED TRACTION FOR SKIS

This is a Continuation in part of, U.S. application Ser. No. 14/120,857 Dated: Jul. 7, 2014

BACKGROUND OF THE INVENTION

1. Field of the Invention

The present invention relates to automated traction for skis on ice and snow; using a system that provides one method for back country skis, and an other method for snowmobile skis.

2. Description of the Related Art

Gas pneumatic powered technologies have come a long way in dependability; and some have sized down parts making them both compact, liter, and are performance proven, for use in micro size work application.

Winter sport technologies can benefit greatly from pneumatic parts, now that the small size need can be met.

In an other aspect power steering technologies are also evolving. Wherein electric power steering systems are pressing to compete with hydraulic power steering systems is one example.

A combination of electro-hydraulic systems are also evolving; one such example is described in: "the 13th Scandinavian International Conference on Fluid Power, SICFP2013, Jun. 3-5, 2013, Linkoping, Sweden (NOVEL ENERGY-SAVING-STEER-BY-WIRE SYSTEM FOR ARTICULATED STEERING VEHICLES: A COMPACT WHEEL LOADER CASE STUDY), Naseem Daher, Chuang Wang, and Monika Ivantysynova.

School of Mechanical engineering, Purdue University, West Lafayette, Ind., USA." And included here as reference.

Snowmobiles have benefited greatly from new technologies in recent years; yet traction remains a problem, when turning a snowmobile especially on hard packed snow, and ice conditions; and even more so at higher speeds. Snowmobile skis tend to sheer in these condition; or if turning a sharp curve. Here again speed is a factor.

Or when turning in a slanted position on a slope. Some remedy for these problems is for the snowmobile driver to lean into the curve. What is needed is a Snowmobile more suitably adapted to cut a curve (follow a curved trajectory line) and maintain more consistency with an inbounds center of gravity; then would a conventional snowmobile directional system. The stability of the snowmobile would also improved with the present embodiment since both skis of a snowmobile are leaning into the curve helping to keep the center of gravity from shifting all its pressure to the outward ski, causing an improved equilibrium of gravity between both skis. And therefore greater traction.

SUMMARY OF THE INVENTION

The present invention relates to traction means; that are provided for back country skis, and for a pair of snowmobile skis; for gaining traction on snow and ice covered surfaces.

In one aspect of the present invention, a light weight system, forming a self sufficient traction apparatus for back country skis used for climbing. Pressurized $CO_2$ gas (incoming from a small cartridge), is used to power a pneumatic system for automating a gripping part. Using a tilt sensor as a switch for a DC powered servo-solenoid valve. No need to push buttons or transmitters for traction, or retraction; since the adjustable tilt sensor does so automatically. If the skis are ascending, then that deploys gripping part. Or if the skis are descending, or in a horizontal positions; then the gas supply is cut off by the solenoid valve; and the gripping part using only mechanical parts retracts.

In an other aspect, a pair of snowmobile skis using oil hydraulic rotary actuators or electric motors to operate a snowmobile skis traction apparatus; that are connected and controlled by the power steering system, of a snowmobile. The pair of skis pivot around a drive shaft that brings the skis to an angle, when turning; producing the traction.

The apparatus can adapt to an electro-hydraulic steering system. Or an electric power steering system; by using the electric motor; as part of the apparatus instead of the hydraulic rotary actuator.

DETAIL DESCRIPTION OF THE INVENTION

The present invention is described with reference to the drawings.

Figure 2:
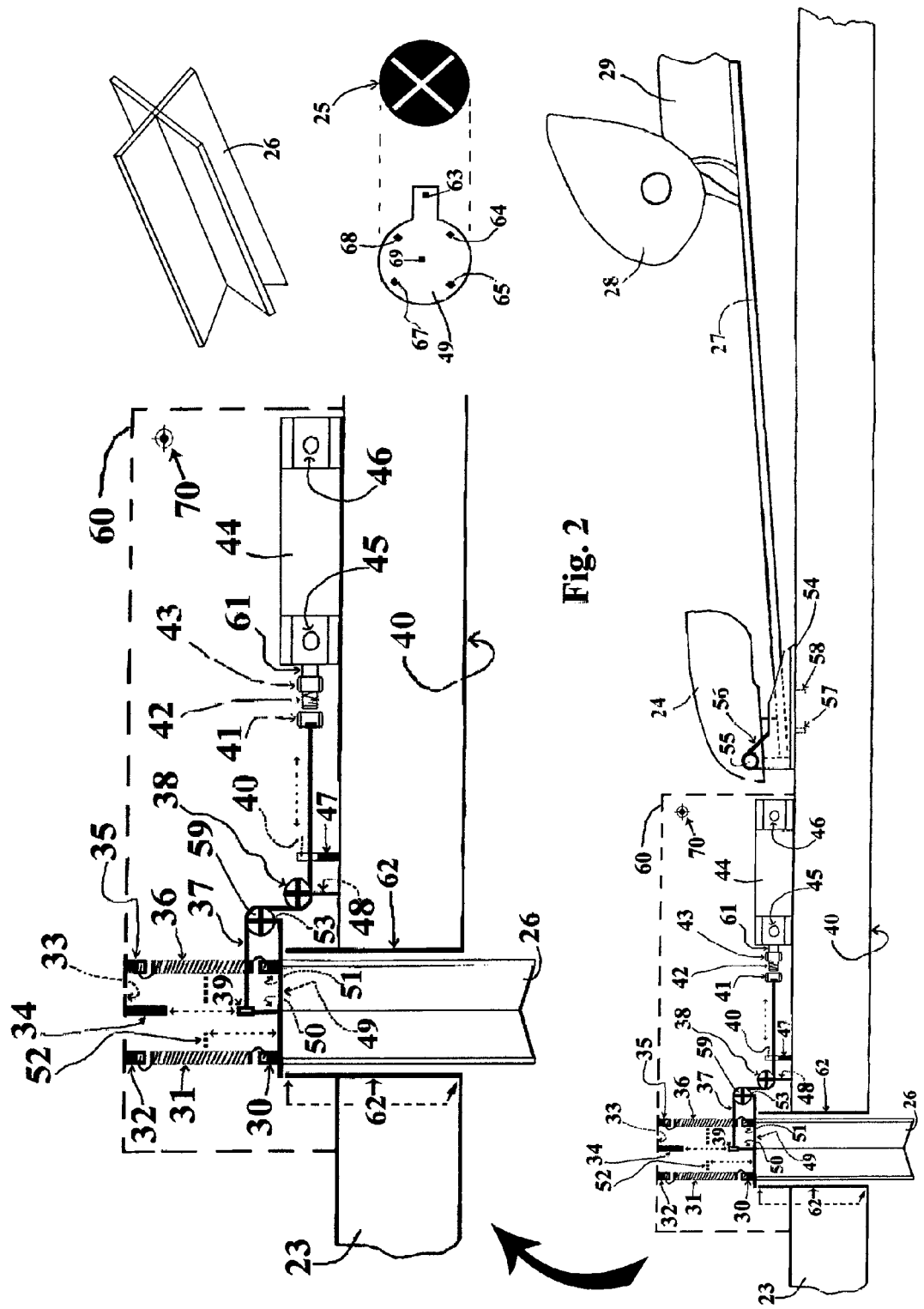
FIG. 2 shows an exploded cross-sectional view of a back country ski having a traction apparatus; with an enlarged image of the traction apparatus above, and the gripping part and fixing plate to the right.

To provide a certain order and steps, and help the viewer save time and have a clear understanding; FIG. 2, is explained alongside to FIG. 3; that describes parts for using pressurized carbon dioxide $CO_2$ gas; and the components therein.

Figure 1:
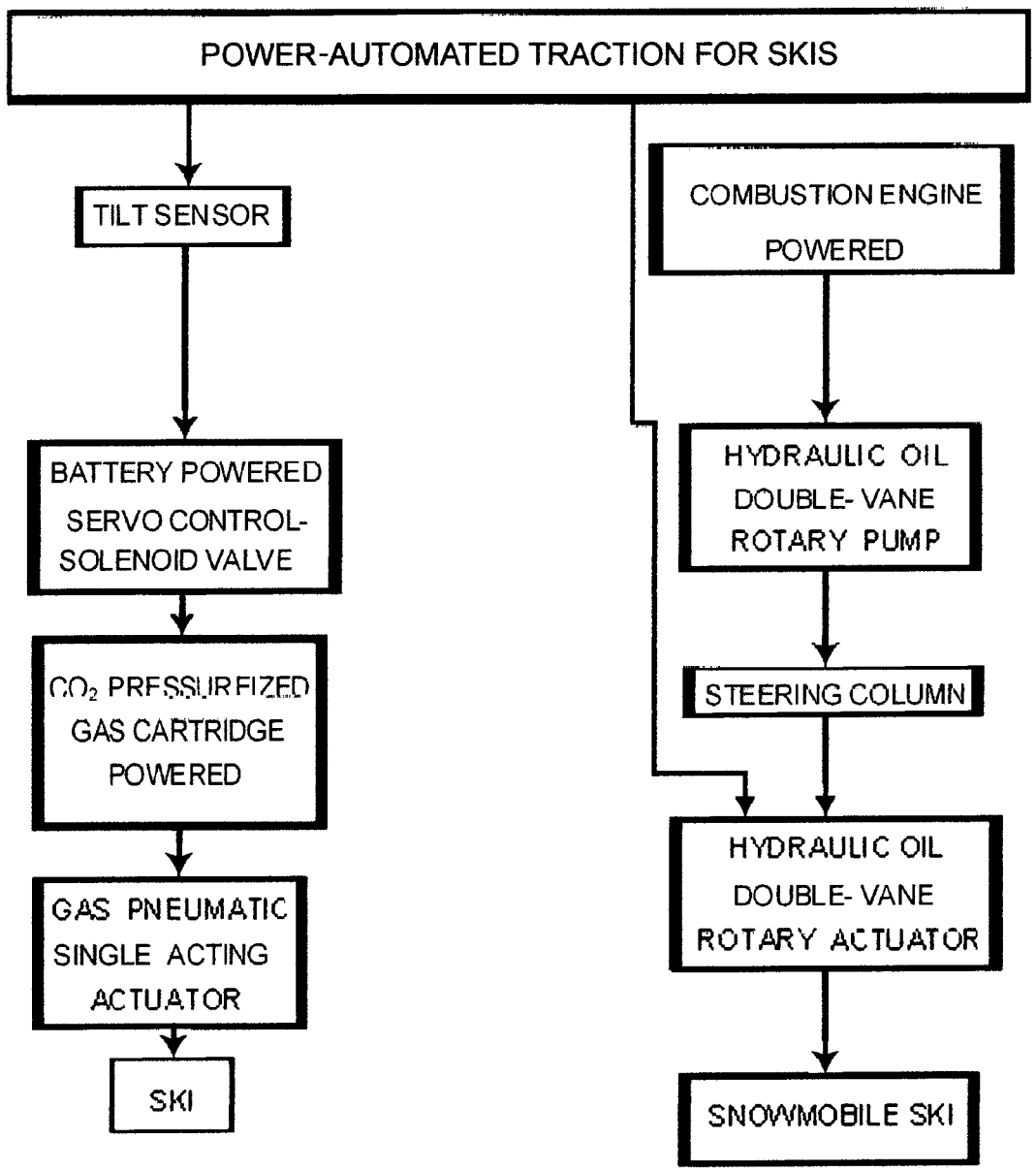
FIG. 1 is a block diagram containing writing describing a traction system; for a ski, and an other system for a snowmobile ski.

FIG. 1, shows a rectangle box containing the title of the invention linked to two vertical columns of inter-connected boxes (identified by a line or arrow).

The first column to the left describes the basic components needed to provide power automated traction for skis. Preferably used for climbing on snow and ice covered surfaces (terrain) with a pair of back-country skis. Although it could in the same way be adapted for climbing using for example: a pair of cross-country skis (not shown).

The second column to the right describes the basic components needed to provide power automated traction for snowmobile skis, that allows a pair of snowmobile skis to run parallel with a curved trajectory line when turning (cornering) as they pivot accordingly with the position of a handlebars steering shaft of a snowmobile; to provide greater traction on snow and ice surfaces (terrain).

Figure 3:
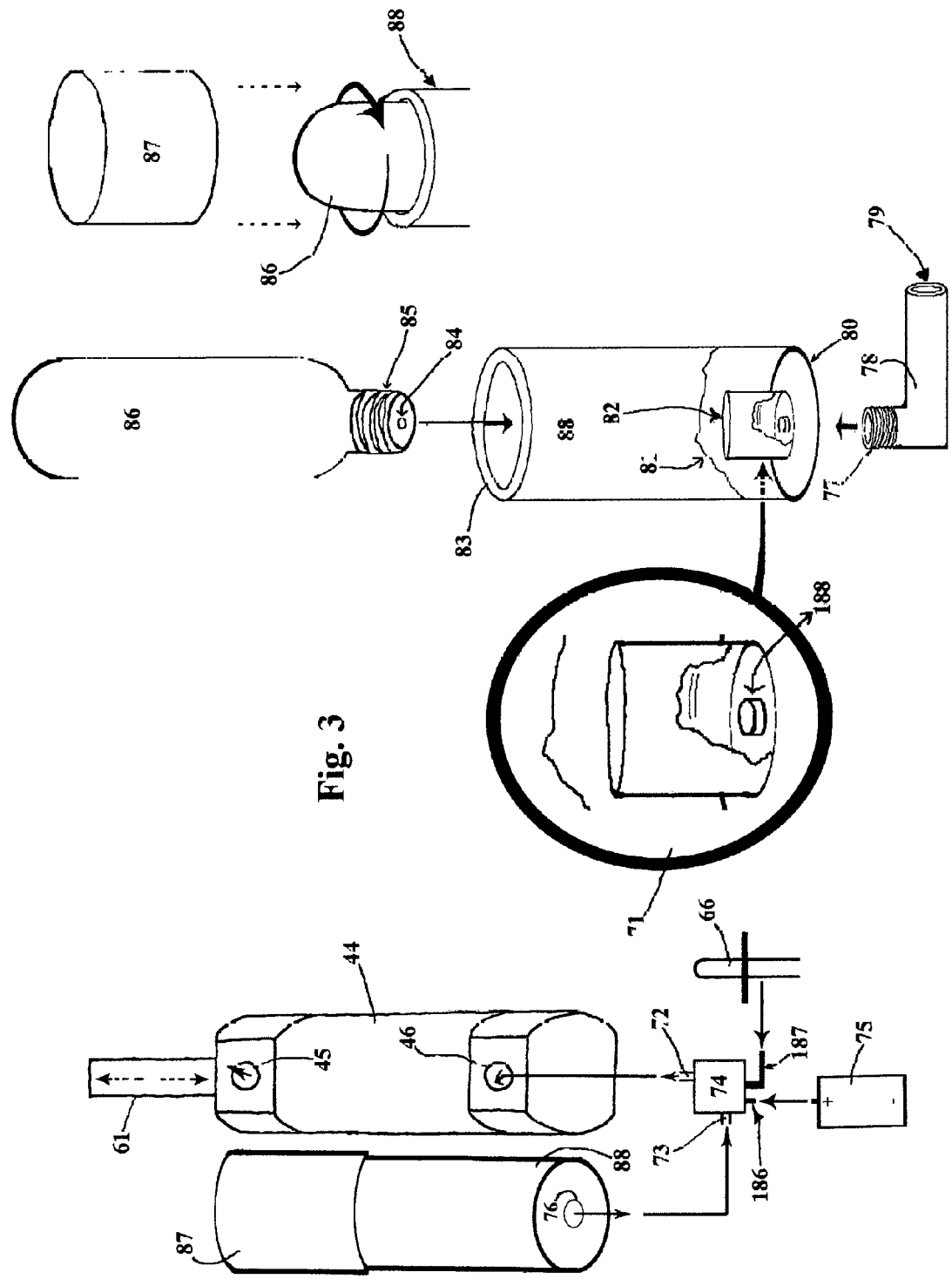
FIG. 3 shows an exploded cross-sectional view of a gas pneumatic actuator and parts set up (left), for the back country ski to (FIG. 2); a pressurized Carbon dioxide $CO_2$ gas cartridge 86, with an ensemble of related parts from (center to right) used for the ski to (FIG. 2).
Figure 4:
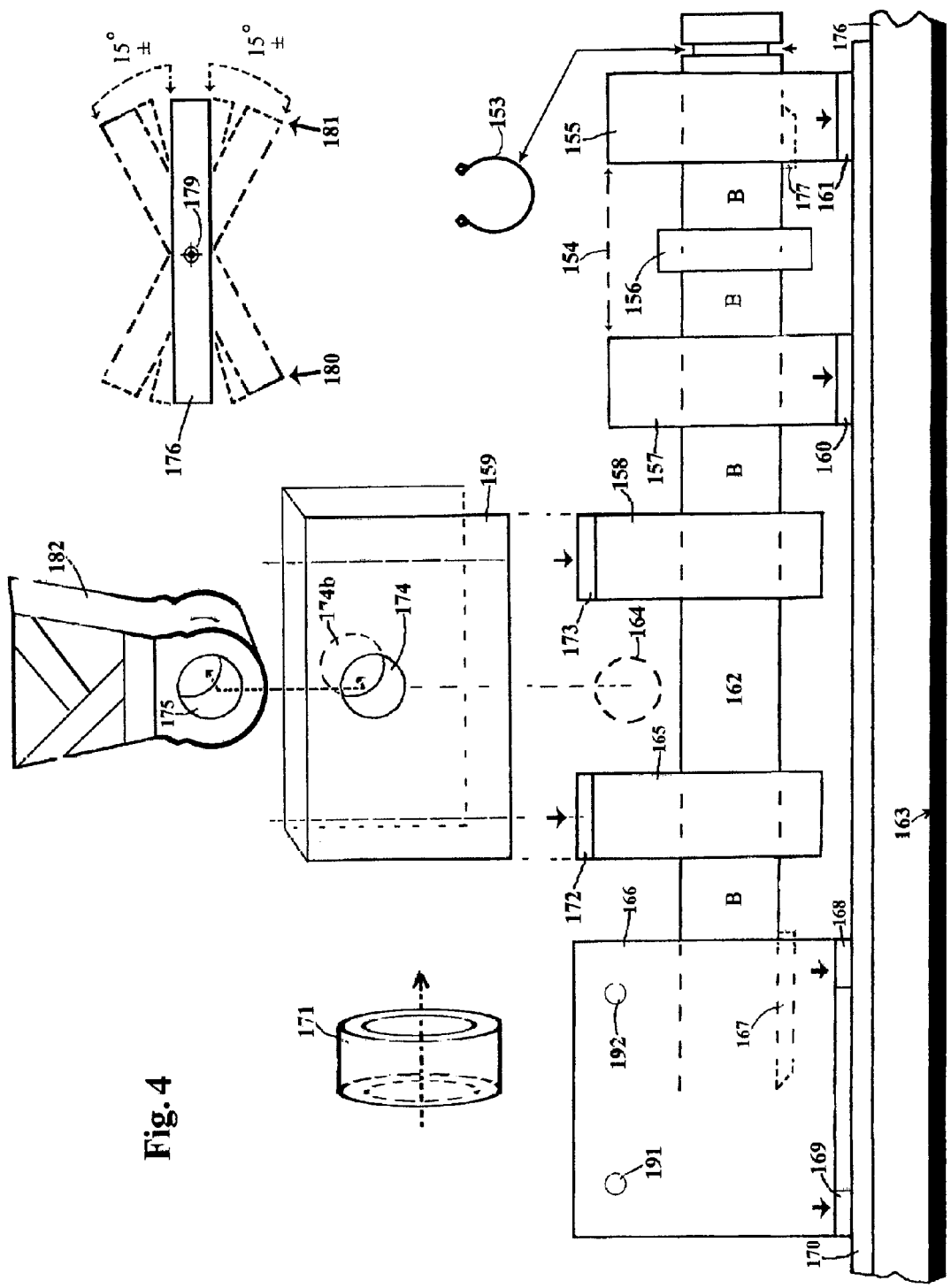
FIG. 4 shows an exploded cross-sectional partially fractured view of snowmobile ski 176, mounted with a traction apparatus for engaging a snowmobile connecting member 182; a diagram (top right) of ski movements.
Figure 5:
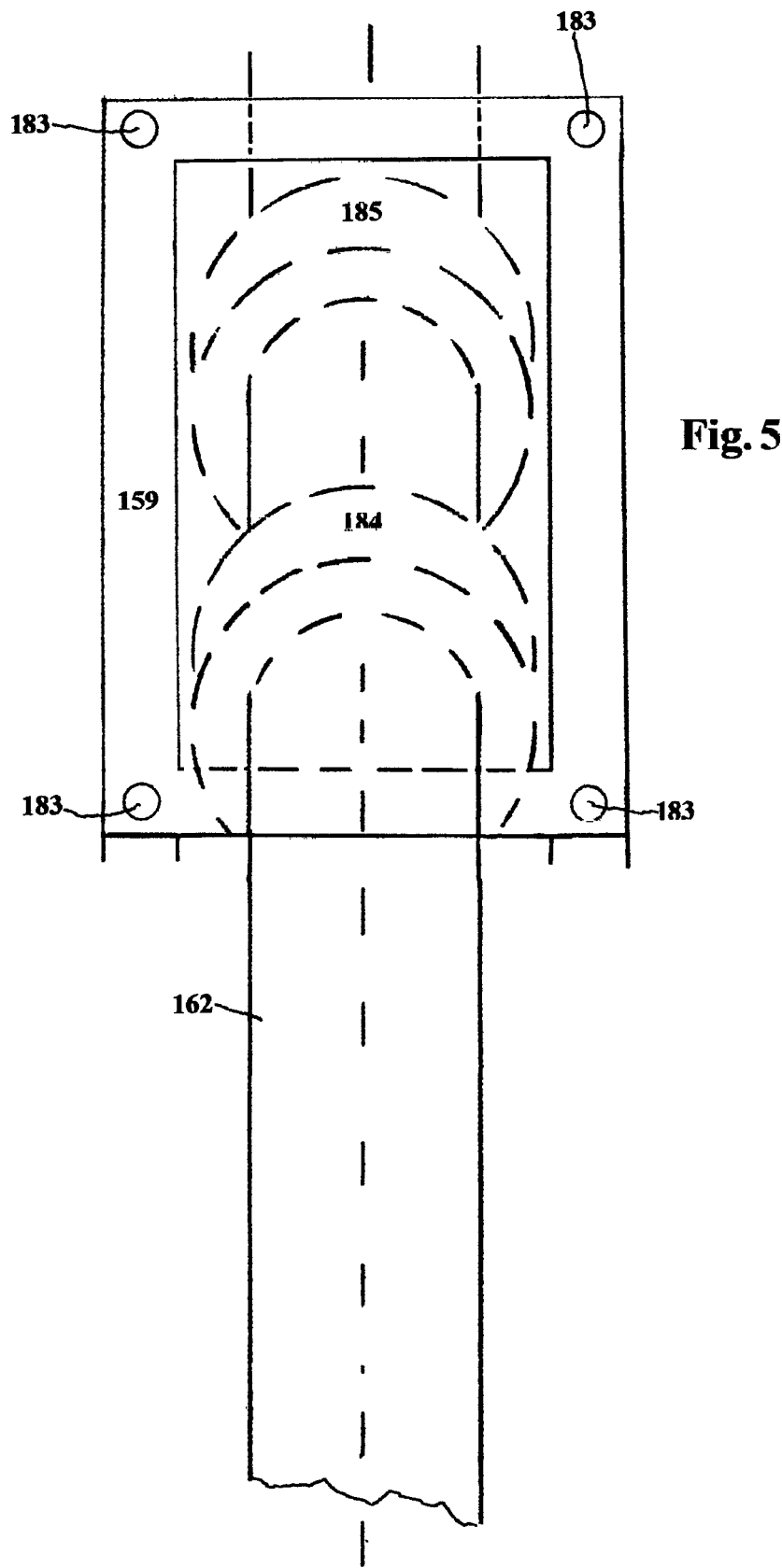
FIG. 5 shows an above view of a cover 159, and to 159 (FIG. 4), for engaging the traction apparatus to (FIG. 4); and other related parts with the snowmobile connecting member 182 to (FIG. 4).

More specific details described to FIG. 1 are to be found in FIG. 2; FIG. 3; FIG. 4; FIG. 5.

FIG. 2, shows a back-country ski 23 having a power automated traction apparatus sitting on, and at the for-front of a back-country ski binding system. The binding system is only for reference, and given a short description for a better understanding of the disposition and function of the apparatus, in con-junction with the binding system.

Toe binding 24, pivots on a shaft 55 that is held by pivoting part 56 that is held to the ski 23 by base plate 54 (part of 56) using screws 57 and 58 drilled into ski 23. The rear binding 29 having a boot retaining jaw 28 to lock the ski boot (not shown) between 24 and 29; herein the boot is supported by part 27 that moves accordingly with the toe binding 24. The traction apparatus is placed at the front of the toe binding 24 leaving sufficient free movement space so as not to interfere with metal cover 60 (that protects the components of the apparatus from exterior environment) that is held to the ski 23 by screws (not shown). The traction apparatus is placed in the above described position for climbing vertically having the added weight of the skier (not shown) to increase the contact of gripping part 26 with ice and ice covered snow surfaces (not shown). An exploded 3 dimensional view of 26 is shown top right of FIG. 2. Gripping part 26 made of material(s) (preferably aluminum for strength and light weight), has an extruded (X) shaped frame; wherein both ends of 26 are equal in every aspect and best described by the white (X) in a black circle that is a plastic bushing part 25. The X shaped end of 26 coming in contact with ice, and snow underneath ski base 40 (as shown in FIG. 2) creates the traction that prevents the ski 23 from sliding in any direction; on ice and especially on snow surfaces. This is because 26 sinks into the snow wherein the extruded part (between ends) of 26 forms a four sided (V) shape holding to the snow. This is clearly visible from the exploded dimensional view of 26. Gripping part 26 fits vertically into the groove (white X) of bushing part 25. Bushing part 25 fits firmly (snug) between position indicators 62. And is limited to position indicated by arrows 62; wherein 25 vertically traverses a predrilled hole in line with binding 24 of ski 23 (transparent view showing only griping part 26). Bushing 25 is cemented (using glue) on the barrel side inside the hole (said barrel side; area between position indicators 62) in ski 23. The top of 26 is spot welded to 64, 65, 67, 68, 69 of metal fixation plate 49 (exploded view of 49 middle right); then welded all around for strength. Fixation plate 49 sits flat on top of bushing part 25. Welding spots of fixation plate 49 correspond to the opposite side of fixation plate 49 to position other welding spots for holding metal parts as follows: Spring anchor stud 30 (above 65) having a hole to hock spring 31. Spring 31 reaches to spring anchor stud 32 that is spot welded to the underside of cover 33. Cover 33 is defined by a continual doted line reaching ski 23 on the left and right. Spring anchor stud 51 (above 68) for hocking spring 36. Spring 36 held by spring anchor stud 35 spot welded to underside of cover 33. Spring 31, and 36 are used to retract gripping part 26 when not in use. Stud 34 is spot welded to underside of cover 33 directly in line above metal anchor 39 welded on top of stud 50. 50 is spot welded at the other end to fixation plate 49; in line above position 69. Gripping part 26 is assigned a limited vertical travel distance that is indicated by a doted line 52 and is indicated by an arrow from doted line 52 to plate 49. The end part of 34 facing the top part of anchor 39 indicated by an arrow controls and determines the travel distance limit 52. And is achieved when 34 and 39 make contact as 26 is retracted by springs 31 and 36 and travels no further. This way the opposite end of 26 comes flush with the bottom end of bushing 25 (not shown) and flush with the ski base 40.

A load-rated wire rope lanyard 37 (known to the art) travels to and fro between anchor 39 and threaded nut 41. The load-rated wire rope lanyard 37 is fix into to anchor 39 attached to a threaded nut 41 that screws onto threads 42 of piston 61; secured into place by a threaded lock nut 43.

A single acting gas pneumatic actuator 44, operates and automates the gripping part 26 by pulling in the load-rated wire rope lanyard 37 via the piston 61, that lowers gripping part 26 into the desired traction position. The load-rated wire rope lanyard 37 is guided by a rectangle ringed threaded stud 47 that screws into a pre drilled hole (not shown) of ski 23; and is further guided by a metal Dowel pin 48 welded at one end to metal pulley 38; wherein the other chamfered end of 48 is set snug into a predrilled hole (not shown) into ski 23. A second pulley 59 held by stud 53 that is welded to position 63 on top of plate 49.

Notes: In the final Draft, if need be there may be added (not shown) (To further help guide the load-rated wire rope lanyard 37. A third pulley welded to a stud that is welded on top of fixation plate 49; set between 50 and 59. This arrangement can and may be added to the apparatus to further prevent slack of load-rated wire rope lanyard 37; as piston 61 extracts causing a slack of load-rated wire rope lanyard 37 between anchor 39 and pulley 38 (more precisely on top of pulley 59 has 39 raises to meet with 34. If this where to be necessary, then the load-rated wire rope lanyard 37 would have to pass underneath the said third pulley in order to firmly guide and prevent any slack or deviation of the prescribed course set forth to FIG. 2).

Actuator 44 is anchored on the ski 23 (anchored to ski not shown) via two pneumatic mounting brackets placed around the barrel; that is one next to port hole 45 and the other next to port hole 46. Both said pneumatic mounting brackets are held down on the ski 23 via screws.

To retract gripping part 26; the single acting gas pneumatic actuator 44 reverses direction of the load-rated wire rope lanyard 37 via piston 61 that self extracts, common with single acting gas pneumatic actuator (known to the art). The gripping part retracts from gripping position to doted line 52; and further helped along by springs 31 and 36, preventing slack of load-rated wire rope lanyard 37.

Single acting gas pneumatic actuator 44 is powered by carbon dioxide $CO_2$ pressurized gas cartridge 86 (FIG. 3).

Further explanation to FIG. 2 is to be found to FIG. 3.

FIG. 3, shows a pressurized carbon dioxide $CO_2$ gas cartridge 86 (top center) having threads 85 that screw into threaded (thread not shown) cup 82 (screws clockwise indicated by arrow, shown far right 86). A fractured view 81 shows cup 82 is part of bottom 80 inside cartridge holder 88. A flexible rubber cover 87 fits over 88 to prevent exterior elements infiltration. An exploded view 71 shows again cup 82. Hole 84 (covered by led seal not shown) is punctured by pype 188 that fits snug inside hole 84. Said puncture occurs as the Carbon dioxide $CO_2$ gas cartridge 86 is screwed securely into cup 82. On exterior underside of bottom part 80, of cartridge holder 88; is located a threaded hole 76 (shown far right; thread not shown) that connects with threaded end 77 of a pneumatic elbow threaded-to-tube adapter 78 (known to the art); wherein the opposite end is a tube adapter 79.

The traction apparatus to (FIG. 2) will now be explained along side; and accordingly with the above first paragraph to FIG. 3.

Therefore proceeding.

In turn 79 connects with one end of a flexible pneumatic plastic tube (plastic tube indicated by arrows); and the opposite tube end connects with adapter 73 of the servo control-solenoid valve unit 74; using a pneumatic straight tube-to-thread adapter (not shown). The above paragraphs explains how the pressurized carbon dioxide $CO_2$ gas travels through the above arrangement to reach the servo control-solenoid valve unit 74.

In one aspect shown far left to FIG. 3, is an arrangement of components parts found underneath cover 60 to (FIG. 2) (that is not visible to FIG. 2) that powers the traction apparatus, for the back country ski to (FIG. 2); that comprising: a single acting gas pneumatic actuator 44 alongside to cartridge holder 88; containing $CO_2$ gas cartridge 86 inside (shown far right to FIG. 3) mounted with said rubber cover 87 not visible with (FIG. 2). The position of some components within the arrangement may vary in the final draft.

Said unit 74 is powered by DC voltage (battery) 75. A wire cable 186 connects 75 with unit 74 indicated by arrow. A tilt sensor 66 (known to the art) is fixed on top of the ski 23 (FIG. 2) (tilt sensor 66, fixed to ski not shown to FIG. 3). Said tilt sensor 66 is connected by wire cable 187 (indicated by arrow) with the servo control-solenoid valve unit 74. Said tilt sensor 66 acts as an on/off switch for 74. Tilt sensor 66 is adjusted (adjustment not shown) to switch on 74, for example: between 5 and 50 degrees of inclination (from plane); when the ski 23 (FIG. 2) is placed in a vertical ascending position (slope, raised terrain); and turns off unit 74 between 51 and 90 degrees inclination (from plane). Therefore when the ski to 23 (FIG. 2) is tilted sufficiently; the tilt sensor 66 switches on (activates) unit 74 that opens a solenoid valve inside 74 (valve not shown) via tube adapter 73. This action releases pressurized Carbon dioxide $CO_2$ gas from cartridge 86; said pressurized gas crossing into unit 74 (as explained earlier in paragraph one to FIG. 3; and therefore proceeding) and out through adapter 72 that is connected with a pneumatic straight threaded tube-to-tube adapter (adapter not shown), and at the opposite end of pneumatic tube (indicated by an arrow); that in turn connects to a pneumatic tube-to-threaded elbow (same as 78) that connects to port hole 46 of single acting pneumatic actuator 44, and 44 to (FIG. 2). This above described action retracts piston 61 that pulls in the load-rated wire rope lanyard 37 (FIG. 2) that lowers gripping part 26 (FIG. 2) to traction position.

When the ski to 23 (FIG. 2) returns to horizontal position, or encounters vertical descending terrain; the tilt sensor 66 will switch off unit 74 that will close the solenoid valve inside 74 cutting off the $CO_2$ gas pressure. This action will cause single acting pneumatic actuator 44 to self extract piston 61 that will reverse the direction of the load-rated wire rope lanyard 37 (FIG. 2) retracting griping part 26 (FIG. 2) as explained in the last paragraph to FIG. 2. The remaining $CO_2$ gas inside the single acting pneumatic actuator 44 will exit via port hole 45. Found on one side of metal cover 60 (FIG. 2); a vent hole 70 (FIG. 2) (indicated by a target sign) prevents any $CO_2$ gas pressure from building up inside said metal cover 60 (FIG. 2).

Note: All parts of cartridge holder 88 are made of metal, with the exception of rubber cover 87.

The rubber cover 87 can be molded into shape. Cartridge holder 88 can be machined; then assembled part by part via threads or welded. It can and may be fabricated using a 3D printer or prototyped, from a digital 3D draft.

At least one of a pneumatic line filter/regulator (not shown); may be added to pneumatic tubing between 79 and 73. Said filter, controlling debris/humidity; said regulator controls gas pressure preventing pressure build up. Pneumatic line filter/regulator components are (known to the art).

FIG. 4, shows a traction apparatus mounted on a snowmobile ski 176; wherein a fractured view of ski176 (at each end of 176) is shown; and further showing a snowmobile attachment part 182. Each traction apparatus of a pair; are each mounted on a separate snowmobile ski of a snowmobile (snowmobile not shown). To provide a lucid understanding to the viewer; only one traction apparatus mounted on one ski 176, are shown. However the pairs of snowmobile skis each mounted with a traction apparatus will be explained together where it becomes obvious that the pairs are needed to proceed.

The snowmobile attachment part 182; and a snowmobile, snowmobile engine, steering column, rotary vane pump, electro-hydraulic pump system, electronic power steering system are used only as reference to the present embodiment.

However ski176 to FIG. 4, and all that pertains to FIG. 4, and (FIG. 5) is part of the present embodiment. Excluding as mentioned, attachment part182 FIG. 4.

Using bolts, fitted with lock washers (not shown); an Hydraulic double-vane rotary actuator 166, is fixed via holes indicated by an arrows via flange mounting parts 169, and 168 to a sturdy metal plate 170, that is between (5 millimeters and 10 millimeters thick; wherein said bolts fitted with washers engage said holes, then metal plate 170 via threaded hole immediately under said 169 and 168; that is two threaded holes facing the viewer to FIG. 4, and two other threaded holes at the back: opposite side (not shown).

Said Hydraulic double-vane rotary actuator 166, engages one end of a metal drive shaft 162. Both 166 and 162 are partially keyed (having a keyway) NOTE: (Shaft162 is partially keyed near the opposite end as well; that is explained further on.). Key 167 is inserted inside the keyway (showing a transparent view of key 167 inserted into 166); interlocking 166 and 162 together. A polyurethane spacer 171, is fitted onto drive shaft 162 and is positioned in between 166 and 165 indicated by the letter (B) on drive shaft 162 (other spacers 171 are to be found along 162 indicated also with the letter (B). Said spacer 171 is also known as a recessed bumper, and are used for protecting parts from impact with one and other (and are known to the art). Following 171, are two equal sized square pillow block bearings 165 and 158 (pillow block bearing are known to the art). Leaving a space in between 165 and 158; that are both mounted with metal cover 159; wherein said cover 159 engages snowmobile attachment part 182, via hole 174, and 1/4*b* (of said cover159) with hole 175 of snowmobile attachment part 182. Said 182 enters the cover 159, via an opening (that is visible) above cover 159 to (FIG. 5), in between 184 (FIG. 5) and 185 (FIG. 5) above the drive shaft 162 (FIG. 5). Holes 174 and 174*b* and 175 mach perfectly aligned to become (form) one hole164; herein a metal supporting shaft threaded at both ends (this supporting shaft is not shown) engages hole 164 crossing from side to side, wherein the threaded ends of said supporting shaft overlap on each sides of cover 59. Said supporting shaft is fitted at both ends with plastic washers (not shown), followed by, flange-slotted-threaded nuts (not shown) one for each sides. Two cotter pins, one for each said flange-slotted-threaded nuts, that enters the slotted part of said flange-slotted-threaded nuts; crossing a pre drilled hole; one on each ends of said supporting shaft to lock in place the described assembly of parts that engages hole 164.

Cover 159 mounts over 165 and 158 (as specified earlier of paragraph two to FIG. 4) so that the bottom part of cover159, ends flush with the bottom extremity of 165 and 158. Both the left side extremity, and right side extremity of cover 159 aligned flush; and match perfectly with the left side extremity of 165, and the right side extremity of 158; and is indicated by two doted lines. Both the cover 159 and the snowmobile attachment part 182, to FIG. 4, are shown from a slight angle, to show their dimensional shape. However, 159 and 182 are align perfectly square, placed inline with 165 and 158 before mounting them together. Cover 159 is securely engaged with 165 and 158 via 183 to (FIG. 5), using four metal bolts (not shown), each said bolt is fitted with a lock washer and metal washers (washers not shown); then put into holes183 (FIG. 5); and secured into threaded holes immediately under holes 183 (FIG. 5). And further indicated by arrows to FIG. 4, via top of 172 of pillow block bearing 165, and via top of 173 of pillow block berring158; not forgetting the other two threaded holes at the opposite side of said arrows to 172 and 173.

A space between snowmobile attachment part 182 and drive shaft 162 is assured by the exact proportions of cover 159 and positioning of hole 164; taking into account pillow block berring165 and pillow block bearing 158. A polyurethane spacer 171 is inserted over drive shaft162 and positioned in between 158 and pillow blocks bearing 157. Said 157 helps support drive shaft 162. Using bolts, fitted with lock washers (not shown); 157 is fixed via hole indicated by an arrow via flange part 160, to metal plate 170; wherein said bolts fitted with washers engage threaded hole indicated by an arrow: that is one threaded hole facing the viewer to FIG. 4, and an other threaded hole at the back: opposite side not shown).

Snowmobile ski 176, and the ski base 163 are both made of material(s).

For a plastic snowmobile ski. Said metal plate170 is fixed to snowmobile ski 176 using bolts: and preferably flat head key locking bolts (Bolts not shown) that enter the underside of ski base 163 of snowmobile ski 176, via pre drilled holes, crossing from side to side of snowmobile ski 176 and base part163; wherein the bolts engage metal plate 170 via threaded holes (not shown) for receiving them from the underside of metal plate 170, said flat head key locking bolts. The head part of said flat head key locking bolts enter flush with the underside of base163 of snowmobile ski 176; and finish flush inside of plate170.

If the snowmobile ski is made of metal; then metal plate170 can be welded with the snowmobile ski 176, along the seams between 170 and 176; or secured using Flat head Bolts, as explained with method for plastic ski.

Proceeding along drive shaft 162; between pillow block bearing 157 and a shaft support block 155 a polyurethane spacer 171, is inserted over drive shaft 162 proceeded by a shaft collar 156, that is in turn proceeded by a polyurethane spacer 171. Said shaft collar 156 (known to the art) is fixed to drive shaft 162, via a recessed set screw (not shown). Shaft collar 156, provides both polyurethane spacers 171; positioned left, and right, of 156 a tight flange fit, that is: between 157 and 156. And between 156 and 155. Shaft support block 155 is fixed to 170 in the same way as 157. Shaft support blocks are known to the art.

Drive Shaft 162 traverses Shaft support block155, and exits 155, to engage with an external retaining ring 153 via a groove indicated by arrows (ring 153 is a preventive measure). A centimeter after said groove the drive shaft ends. The drive shaft 162 is interlocked with Shaft support block155; since 162 and 155 are both partially keyed. Key 177 is inserted inside the keyway (showing a transparent view of key 177 inserted into 155); interlocking 155 and 162 together.

Therefore, put in simple terms; the Hydraulic double-vane rotary actuator 166, and the shaft support block155 rotate with the ski 176; but not the cover 159, and therefore not the snowmobile attachment part 182.

Furthermore only the berrings184 (FIG. 5), and 185 (FIG. 5), rotate inside the pillow blocks165, and 158. But not their pillow blocks. 157 is an essential part and preventive measure by supporting the drive shaft 162, so it does not bend from the weight of the snowmobile and passengers aboard.

FIG. 5, bearings184, of pillow block 165 to (FIG. 4) and bearings 185, of pillow block 158 to (FIG. 4) are both shown without the pillow blocks; to hopefully give the viewer a clear understanding; about the movements of the drive shaft 162, in relation to the bearings 184, and 185, that turn in accordance to the drive shaft 162. And since the pillow blocks part of 165, and 158, don't move; but instead remain stable with the cover 159 and 159 to (FIG. 4), that holds, supports a snowmobile via the snowmobile attachment part 182 (FIG. 4); that is positioned above and between 184, and 185. This way the snowmobile ski 176 (FIG. 4) (see Diagram too right to (FIG. 4)); is enabled to pivot from side to side from the axis 179 (FIG. 4) (see target sign), synchronously with the drive shaft 162. For example: 15 degrees to the right of the axis, or 15 degrees to the left of the axis.

The Hydraulic double-vane rotary actuator 166 turns the drive shaft 162 in relation to the hydraulic oil pressure entering, said 166. That is, via port hole 191 (FIG. 4), and exiting via port hole192 (FIG. 4); or the reverse: entering 192 (FIG. 4), and exiting 191 (FIG. 4). Hither way determines the direction the drive shaft 162 turns: clockwise or counterclockwise. This next step is determined by the hydraulic power steering system of a snowmobile, powered by the snowmobile engine.

Using hydraulic grade hose lines and hydraulic grade fittings that connect to port hole 191 (FIG. 4) and port hole192 (FIG. 4); of the Hydraulic double-vane rotary actuator 166 (FIG. 4) of each apparatus to (FIG. 4) mounted on each of a pair of snowmobile skis of the present invention. And first connecting each ends of hydraulic lines coming from each port 191 (FIG. 4); connecting them to a hydraulic (T) adapter fittings. Then adding a hydraulic line to the remaining adapter end of said (T) fitting; and connecting the opposite end of said hydraulic line (having a adapter fitting to connect with) to the right side valve connecting port of the hydraulic oil double-vane rotary pump of a snowmobile. Then connecting each port holes 192 (FIG. 4) with the methods used for (connecting) port holes 191; but instead connecting the ports 192 (FIG. 4) with the left side valve connecting port of said pump.

Now that all is connected to a snowmobile; the direction that the snowmobile steering column is turning (is turned) determines the valve (said right valve or left valve) on said pump that will be sending hydraulic oil pressure accordingly to the designated port hole 191 (FIG. 4), or 192 (FIG. 4) of the Hydraulic double-vane rotary actuator 166. As mentioned earlier, the direction the steering column is turned; this will determine the direction the drive shaft 162 (FIG. 4) pivots; clockwise or counterclockwise. This way the pair of skis 176 (FIG. 4) will also pivot accordingly, and in synchronization with the drive shaft 162 (FIG. 4) of each apparatus (FIG. 4) mounted on each of the skis176 (FIG. 4).

The Traction Produced by Each Mounted Apparatus to (FIG. 4), on Each of a Pair of Snowmobile Skis is Explained:

As with all snowmobile skis, it is when tuning a curve that the traction is most needed; but is also the critical point, determining if the traction of the skis is good or bad.

Therefore, below describes a pair of snowmobile skis each mounted with the apparatus of the present invention in a turning situation.

The gravitational force exerted on each ski increases closer to the inbounds of the curved trajectory line as the skis tilt in accordance with a curved trajectory line; increasing traction of the pair of skis on snow (see diagram top right to (FIG. 4).

Traction on Ice is Explained.

The edge part of ski 176; shown where the arrow ends base part 163 (FIG. 4). See also Diagram top right (FIG. 4); that shows the edges to both sides of ski; 180 (FIG. 4) and 181 (FIG. 4). When the snowmobile skis are turning the edges of the skis are parallel to a curves trajectory line (cutting into the ice) that in turn increases traction of the skis; and the effect is furthermore amplified by the mass weight of the snowmobile that is shifted into the curve and exerted on the edge of the pair of skis has they are cornering on ice surfaces.

In an other aspect of the traction apparatus for snowmobile skis of the present invention.

The traction apparatus for snowmobile skis, can and may connect and operate with; an electro-hydraulic steering system; by connecting with the ports of solenoid valves of an electro-hydraulic rotary pump, with the hydraulic oil lines that are connected with 191 (FIG. 4) and 192 (FIG. 4) of 166 (FIG. 4).

Furthermore, The traction apparatus for snowmobile skis, can and may connect to operate with: an Electric power steering system. Wherein the Hydraulic double-vane rotary actuator 166 to (FIG. 4), is instead replaced by an Electric motor (not shown). This is done by aligning the electric motors drive shaft, with the drive shaft 162 (FIG. 4) and connecting them together using a keyed shaft coupling (not shown, and known to the art). But before fixing the said shaft coupling; adding polyurethane spacers 171 to (FIG. 4); one on each sides of the said keyed shaft coupling; followed by shaft collars similar to 156 to (FIG. 4), again one for each sides. This arrangement will protect parts from impact. Then connecting the electric motors wires to the said Electric Power steering system using wire cable.

NOTES to FIG. 4, and to FIG. 5:

The snowmobile ski 176 to (FIG. 4), wherein the pair of skis are made of plastic; can and may have metal blade edges (not shown), 180 (FIG. 4) and 181 (FIG. 4) along the sides of each skis; similar to blade edges on alpine skis.

Metal parts comprising: square pillow block part of 165 (FIG. 4), square pillow block part of 158 (FIG. 4), pillow block part of 157 (FIG. 4), the Shaft support block 155 (FIG. 4), the cover 159 (FIG. 4), and 159 to (FIG. 5); can and may preferably be made of aluminum to provide strength and light weight; and preferably each having a corrosion resistant zinc coating.

Pillow block bearing 157 (FIG. 4) can, and may be replaced by a Shaft support block, similar to 155 (FIG. 4). Said polyurethane spacers are preferred over rubber for their abrasive resistance and support impacts from other parts even under low temperatures.

Said metal drive shaft 162 (FIG. 4), can and may preferably made of hard 1117 steel (known to the art), that is corrosion resistant to face the environment; and to resist the compounded weight of the snowmobile and passengers, and when applying the brakes, and for resisting to impacts, for example: when hitting bumps.

What is claimed is:

1. A System for producing traction on snow and ice covered surfaces for use with skis; said system comprising:
    at least one traction apparatus, said apparatus is adapted to each of a pair of skis, each apparatus has an adjustable tilt sensor activated by inclination, and acting as an on/off switch for a unit; consisting of a DC powered servo control-solenoid valve that controls,
    incoming pressurized carbon dioxide gas from at least one cartridge; said pressurized gas powers at least one gas pneumatic actuator connected with at least one gripping part that extrudes on vertical ascending terrain and retracts on level, and descending terrain.
2. The gripping part of the ski traction apparatus to claim 1, is an extruded X shaped frame made of metal or plastic.

* * * * *